(12) United States Patent
Ziegler

(10) Patent No.: US 7,974,903 B2
(45) Date of Patent: Jul. 5, 2011

(54) SYSTEM AND METHOD FOR ANALYZING DISTRIBUTIONS FOR TAXATION ANALYSIS

(75) Inventor: Alexandre Ziegler, Collonge-Bellerive (CH)

(73) Assignee: Thomson Reuters (Tax & Accounting), Carrolton, TX (US)

( * ) Notice: Subject to any disclaimer, the term of this patent is extended or adjusted under 35 U.S.C. 154(b) by 880 days.

(21) Appl. No.: 11/728,125

(22) Filed: Mar. 23, 2007

(65) Prior Publication Data

US 2007/0226153 A1     Sep. 27, 2007

Related U.S. Application Data

(60) Provisional application No. 60/743,766, filed on Mar. 24, 2006.

(51) Int. Cl.
*G06Q 40/00*     (2006.01)
(52) U.S. Cl. ...................................................... 705/36 T
(58) Field of Classification Search .................... 705/19, 705/31, 36 R, 36 T
See application file for complete search history.

(56) References Cited

U.S. PATENT DOCUMENTS

| | | | |
|---|---|---|---|
| 6,671,673 B1* | 12/2003 | Baseman et al. | 705/7 |
| 2002/0055972 A1* | 5/2002 | Weinman, Jr. | 709/203 |
| 2003/0195780 A1* | 10/2003 | Arora et al. | 705/7 |
| 2004/0059627 A1* | 3/2004 | Baseman et al. | 705/10 |
| 2004/0088233 A1* | 5/2004 | Brady et al. | 705/31 |
| 2005/0209939 A1* | 9/2005 | Joseph et al. | 705/31 |
| 2006/0036525 A1* | 2/2006 | Ramos et al. | 705/35 |
| 2007/0198390 A1* | 8/2007 | Lazear et al. | 705/36 T |

OTHER PUBLICATIONS

ITx Software (Liquid Engines, "International Income Tax Management", 2005, http://web.archive.org/web/20051219091909/www.liquidengines.com/Documents/Datasheet_ITx.pdf, p. 1-5.*
LiquidEngines_Web_Archive, "Liquid Engines|Products", 2005-2006, http://web.archive.org/web/20060114152952/www.liquidengines.com/solution.htm, pp. 1-22.*
Chevron, "Chevron Selects Liquid Engines ITX to Assist in Managing Its Foreign Tax Credit (FTC) Process; Breakthrough Software Provides Greater Insight and Drives Efficiencies into Multi-year Global Tax Management Process," Dec. 22, 2005, pp. 1-3.*

* cited by examiner

*Primary Examiner* — Jagdish N Patel
*Assistant Examiner* — Kenneth Bartley
(74) *Attorney, Agent, or Firm* — Valenti Hanley & Robinson, PLLC; Kevin T. Duncan

(57) ABSTRACT

A method and system receives one or more target distribution amounts corresponding to currency totals for one or more foreign entities to distribute to one or more domestic entities in one or more years, the foreign entities being direct or indirect subsidiaries of the one or more domestic entities, then it receives entity data pertaining to tax relevant attributes for the one or more domestic and foreign entities over the one or more years, and receives distribution constraints for each foreign entity, the distribution constraints including a minimum distribution amount and a maximum distribution amount for each entity in each year. The method and system creates one or more distribution scenarios including corresponding tax costs based on the entity data and the distribution constraints and identifies a distribution scenario from the one or more distribution scenarios having the lowest tax and meeting the one or more target distribution amounts.

27 Claims, 14 Drawing Sheets

| Data Element | ITx Defaults | Foreign Treatment | | | US Treatment | | |
|---|---|---|---|---|---|---|---|
| | | Corp. | PS | Br. | Corp. | PS | Br. |
| Exchange rate from the entity's FC to USD | Current spot rates off the internet | X | X | X | X | X | X |
| Exchange rate from the entity's FC to each of its owners' FC | Current spot rates off the internet | X | X | X | X | X | |
| Distributive share of each owner | Ownership percentage | X | X | | X | X | |
| Percentage of the distribution income that is taxable for foreign purposes for each *foreign* owner | 100% | X | X | X | | | |
| Withholding rate applicable to payments made to each owner | W/H rate for distributions for the relevant country pair if stored in ITx already, otherwise zero | X | X | X | X | X | X |
| Percentage of the distribution income that is taxable for US purposes for each owner | 100% | | | | X | X | |
| Whether to flow indirect tax credits to each owner | Yes | | | | X | | |
| Subbasket in which the dividend income in each basket should be recorded by each owner | Subpart F (FPHCI – Divs) | | | | X | | |
| Factor used to spread withholding taxes associated with ROC to subbaskets | 100% General NSF | X | | | X | X | X |
| Factor used to spread CG income and withholding tax expense to subbaskets | 100% US for *domestic* owners, 100% Passive SF (FPHCI – Divs) for *foreign* ones. | | | | X | X | |
| Factor used to spread creditable taxes from CG withholding to subbaskets | 100% General NSF for *domestic* owners, 100% Passive SF (FPHCI – Divs) for *foreign* ones. | | | | X | X | |

FIG. 10

Results

| Select | Oper-ation | Year | Entity | FC | Exchange Rate (USD per FC) | Current Distribution ||||||||| All Distributions (Cumulative) ||||
|---|---|---|---|---|---|---|---|---|---|---|---|---|---|---|---|---|---|
| | | | | | | Pre-Tax FC △ | Pre-Tax USD △ | After Tax USD △ | Tax Rate % △ | For. Tax USD △ | US Tax USD △ | FTC Recei-ved △ | FTC Utili-zed △ | Unused FTC Penalty % △ | Pre-Tax USD △ | After Tax USD △ | Tax USD △ | Tax Rate % △ |
| ⊗ | 1 | 2006 | CFC 2 | EUR | 1.25 | 4,000 | 5,000 | 4,750 | 5.00 | 150 | 100 | 50 | 40 | 0.20 | 5,000 | 4,750 | 250 | 5.00 |
| ⊗ | 2 | 2006 | CFC 2 | EUR | 1.25 | 800 | 1,000 | 920 | 8.00 | 50 | 30 | 30 | 30 | 0.00 | 6,000 | 5,670 | 330 | 5.50 |
| ○ | 3 | 2007 | CFC 2 | EUR | 1.25 | 800 | 1,000 | 900 | 10.00 | 80 | 20 | 10 | 20 | -1.00 | 7,000 | 6,570 | 430 | 6.14 |
| ⊗ | 4 | 2006 | CFC 3 | CHF | 0.80 | 1,250 | 1,000 | 880 | 12.00 | 80 | 40 | 5 | 5 | 0.00 | 8,000 | 7,450 | 550 | 6.88 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

1200

Commit    Re-estimate

FIG. 12

Results

Current Distribution / All Distributions (Cumulative)

| Select | Oper-ation | Year | Entity | FC | Exchange Rate (USD per FC) | Pre-Tax FC | Pre-Tax USD | After Tax USD | Tax Rate % | For. Tax USD | US Tax USD | FTC Recei-ved | FTC Util-ized | Unused FTC Penalty % | Pre-Tax USD | After Tax USD | Tax USD | Tax Rate % |
|---|---|---|---|---|---|---|---|---|---|---|---|---|---|---|---|---|---|---|
| ◉ | 1 | 2006 | CFC 2 | EUR | 1.25 | 4,000 | 5,000 | 4,750 | 5.00 | 150 | 100 | 50 | 40 | 0.20 | 5,000 | 4,750 | 250 | 5.00 |
| ◉ | 2 | 2006 | CFC 2 | EUR | 1.25 | 800 | 1,000 | 920 | 8.00 | 50 | 30 | 30 | 30 | 0.00 | 6,000 | 5,670 | 330 | 5.50 |
| ○ | 3 | 2007 | CFC 2 | EUR | 1.25 | 800 | 1,000 | | 12.00 | | | | | | | | | |
| ◉ | 4 | 2006 | CFC 3 | CHF | 0.80 | 1,250 | 1,000 | 980 | 12.00 | 80 | 40 | 5 | 5 | 0.00 | 8,000 | 7,450 | 550 | 6.88 |

1300

Commit    Re-estimate

FIG. 13

SYSTEM AND METHOD FOR ANALYZING DISTRIBUTIONS FOR TAXATION ANALYSIS

RELATED APPLICATION

This application is related to and hereby claims the priority benefit of U.S. Provisional Patent Application No. 60/743,766 filed Mar. 24, 2006, incorporated herein by reference in its entirety.

TECHNICAL FIELD

This application relates to a method and system for analyzing distributions among related entities to determine specific entities' tax cost.

BACKGROUND

The United States (US) tax domestic corporations on their worldwide income. In order to avoid double taxation of foreign source income, US tax rules allow these corporations to credit foreign taxes paid on such income. A domestic corporation's foreign source income, the amount of available foreign tax credits, and therefore its US tax liability, depend in part on the amount and characterization of the distributions it receives from its direct foreign subsidiaries (the same holds if the entity files a US tax return as part of an affiliated group). These direct subsidiaries themselves may have further (indirect) subsidiaries in a tier-like structure. The characterization of distributions made by foreign subsidiaries for both foreign and US tax purposes generally depends on the entities' type (corporation, branch or partnership), on the ownership relationships between them, and/or on the types of income they earn (e.g., interest income versus income from sales of goods and services). For complex entity structures involving a large number of entities of several types over multiple tiers and earning several types of income, determining the individual entities' as well as the corporate group's overall tax liability for a given distribution strategy and determining the best such strategy from a tax perspective is usually very cumbersome.

BRIEF DESCRIPTION OF THE DRAWINGS

The present invention is illustrated by way of example, and not by way of limitation, in the figures of the accompanying drawings in which:

FIG. 10 illustrates an example embodiment of a table of default values associated with distribution analysis-specific data;

FIG. 12 illustrates an example embodiment of a screenshot of a set of results returned by a distribution analyzer;

FIG. 13 illustrates an example embodiment of a table generated when "Re-estimate" has been selected.

DETAILED DESCRIPTION

In the following description, for purposes of explanation, numerous specific details are set forth in order to provide a thorough understanding of one or more embodiments of the present invention. It will be evident, however, to one skilled in the art that the present invention may be practiced without these specific details.

Various example embodiments of an international tax (ITx) analysis system, which includes various applications and modules associated with a distribution analyzer, are described herein. In one embodiment, the distribution analyzer determines the amount to be distributed by each foreign entity in each year captured in the system (henceforth called "scenario year") to bring a targeted amount of cash back into the United States (US) at the lowest possible multi year tax cost. The determined amount may be subject to lower and upper bounds (e.g., the distribution analyzer determines the amounts distributed subject to distributing at least, but no more than a given amount out of each entity in each scenario year). The distribution analyzer may receive data on one, several, or all entities captured in a distribution scenario, receive objectives and constraints associated with the computation operations, and process the received data according to the received objectives and constraints to generate one or more sets of results. Additionally, the distribution analyzer may generate one or more views and/or reports in response to the one or more generated sets of results.

An example benefit that may be realized in various embodiments is to minimize tax cost, where the tax cost being minimized is the sum of the additional (1) foreign income tax (converted to U.S. dollars (USD)), (2) foreign withholding tax (converted to USD), and (3) U.S. tax—resulting from the distributions being created. In other words, among various embodiments, the distribution analyzer seeks to minimize the additional cash outlay caused by the distributions.

Figure 1:
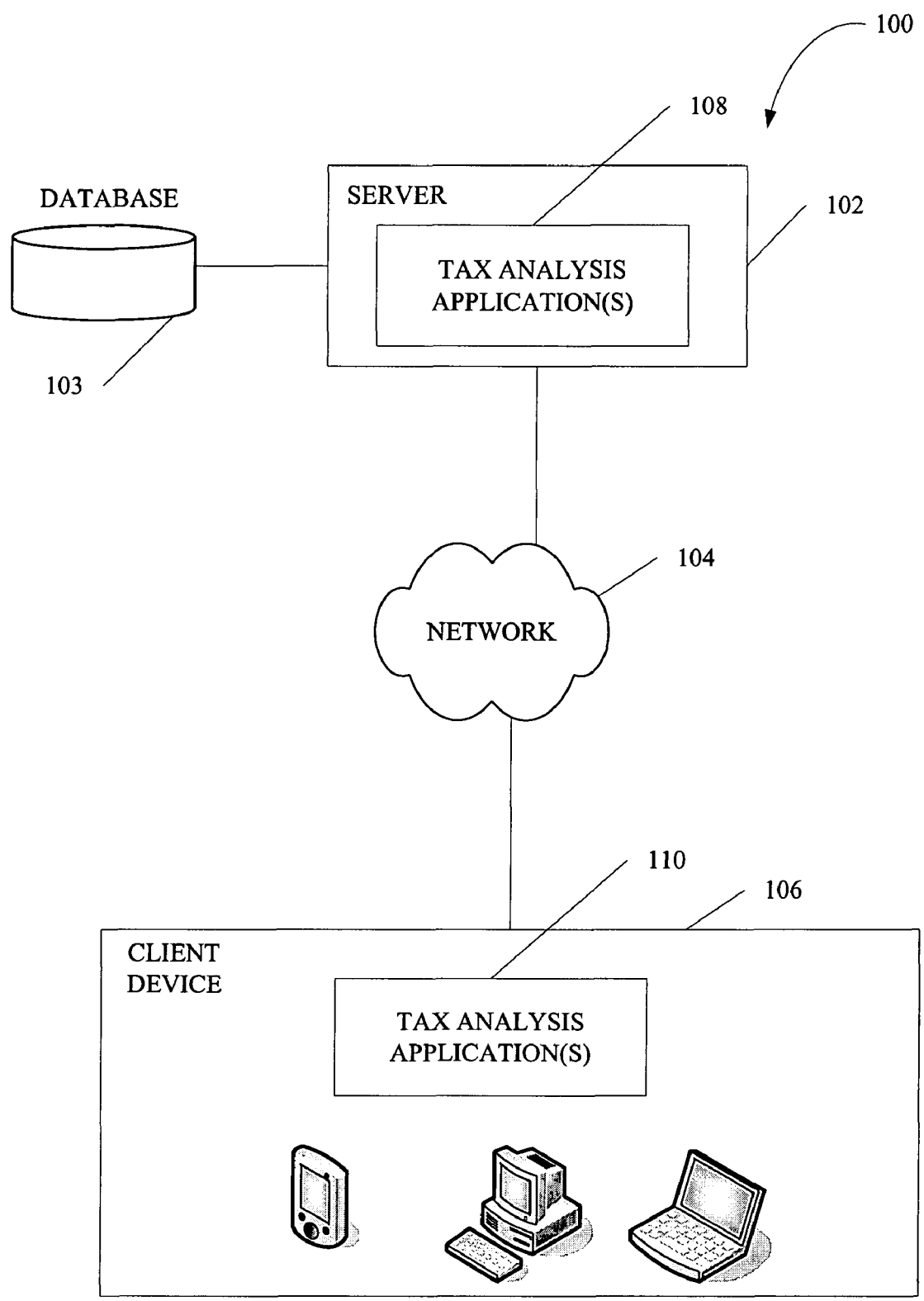
FIG. 1 is a diagram that illustrates an example embodiment of a tax analysis system.

FIG. 1 is a diagram that illustrates an example embodiment of a tax analysis system 100, which may be used to determine the amount to be distributed by each foreign entity in a hierarchy of entities in each scenario year to bring a targeted amount of cash back into the United States (US) at the lowest possible multi-year tax cost.

The tax analysis system 100 includes a server 102, a database 103, a network 104, and a client device(s) 106. The client device(s) 106 and the server 102 may include tax analysis applications 108 and 110, respectively. The tax analysis applications 108, 110 may be used in a multitude of configurations to execute the method and operations described herein. Additionally, the client device(s) 106 may include any device (e.g., personal computer, laptop, personal digital assistant, etc.) that may execute one or more tax analysis applications 110. The client device(s) 106 may also include one or more storage devices to store and recall a portion of or all of the data used in the operations described herein. In one embodiment, the client device(s) 106 may access, receive, communicate, and store data on the server 102 and database 103 via the network 104. Additionally, the client device(s) 106 may remotely access tax analysis functionality (e.g., via tax analysis application(s) 108) on the server 102 to process data communicated from the client device(s) 106 or data associated with the client device(s) 106 that may be stored in the database 103. In another embodiment, the operations described herein may be all or in part realized by executing some or all of the processes via tax analysis application(s) 110 on the client device(s) 106.

For simplicity, example embodiments described hereinafter will treat all child entities as direct or indirect foreign subsidiaries of a United States (US) parent entity and focus on United States Tax law. However, in other embodiments, the same systems and methods described herein may be applied to a parent entity being a non-US entity in one jurisdiction and the child entity being located in the same or another jurisdiction. Additionally, although many business forms exist, for simplicity three example business forms are discussed herein, corporations, partnerships, and branches. Foreign corporations held by a United States (US) entity may either keep generated income in the foreign jurisdiction or distribute the income back to the US entity; U.S. taxation of the income earned by such foreign corporations is generally deferred until a distribution takes place, with some exceptions (the so-called Subpart F rules). Foreign branch and partnership business forms are called flow through entities (FTE); for US tax purposes, their income flows to their parent entity in the year it is earned.

Figure 2:
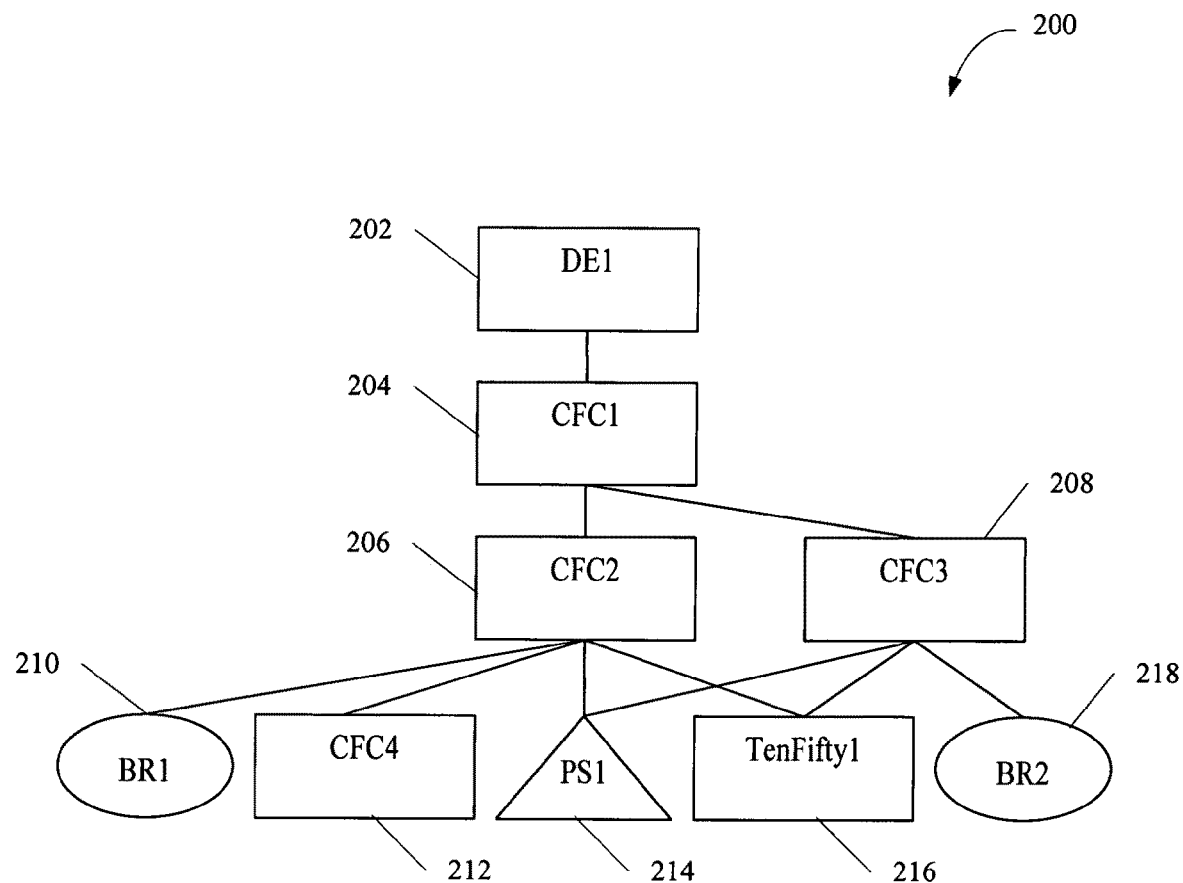
FIG. 2 is a diagram of a hierarchal entity tree illustrating an example embodiment of an entity ownership structure.

FIG. 2 is a diagram of a hierarchal entity tree 200 illustrating an example entity ownership structure. FIG. 2 includes a domestic entity and various foreign entities. "DE" denotes a domestic entity, "CFC" a controlled foreign corporation, "BR" a branch, "PS" a partnership and "TenFifty" a noncontrolled foreign corporation. The hierarchal entity tree 200 includes DE1 202, CFC1 204, CFC2 206, CFC3 208, BR1 210, CFC4 212, PS1 214, TenFifty1 216, and BR2 218. The ownership relationship between entities is illustrated by their respective connections; ownership percentages have been omitted for simplicity. The tax analysis system 100, and specifically the tax analysis application(s) 108, 110, may be used to determine the amount to be distributed by each foreign entity in the hierarchal entity tree 200 for each scenario year to bring a targeted amount of cash back into the United States (US) via the DE1 202 at the lowest possible multi-year tax cost. The set of these distributions will be referred to as a "distribution plan" in what follows.

Figure 3:
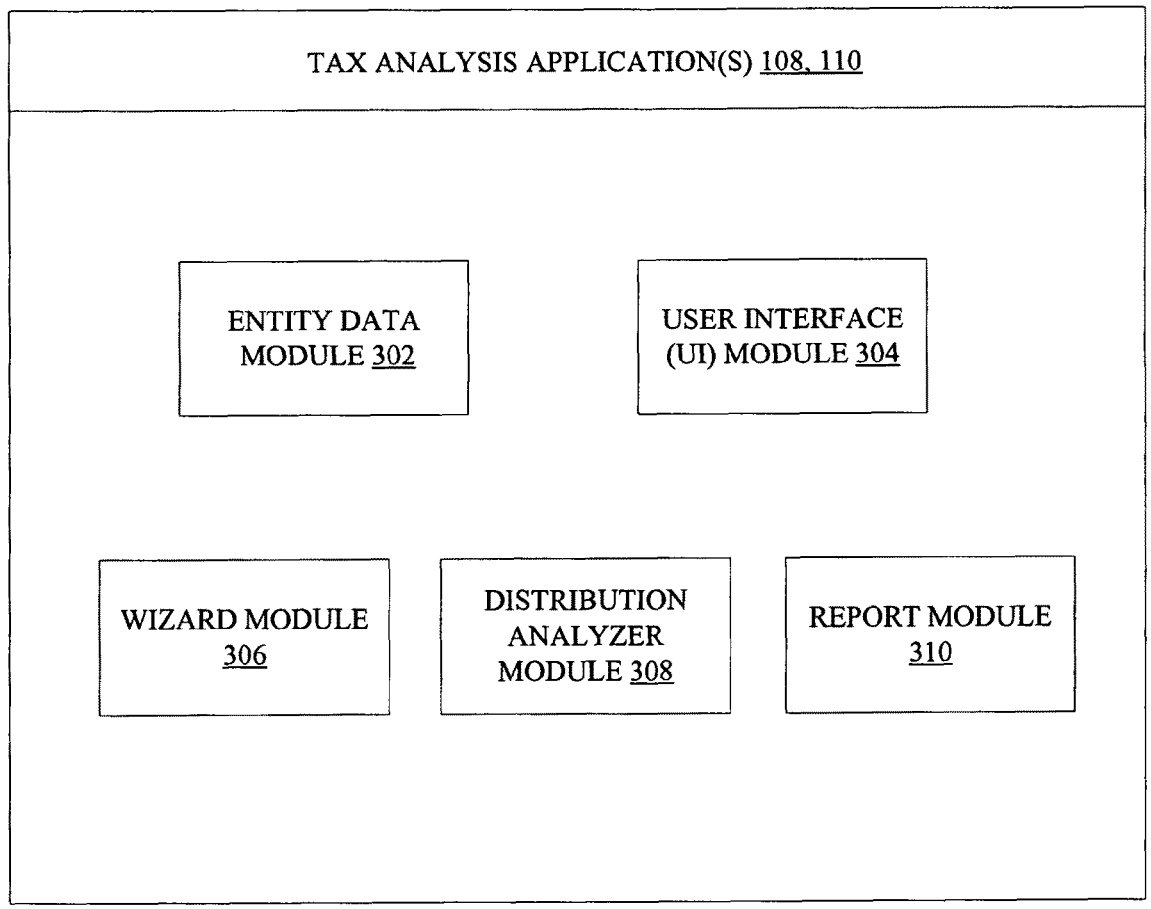
FIG. 3 is a block diagram illustrating example modules, according to one embodiment, that may be utilized by one or more tax analysis application(s) associated with a distribution analyzer.

FIG. 3 is a block diagram illustrating example modules that may be utilized by one or more tax analysis application(s) 108, 110 associated with a distribution analyzer for performing any of the methods and operations described herein. It can be appreciated that the modules described herein are merely for example, and in various embodiments the processes associated with the distribution analyzer and carried out by these modules may be combined into fewer or more than the example modules provided.

In one embodiment, the tax analysis application(s) 108, 110 includes an entity data module 302, a user interface (UI) module 304, a wizard module 306, a distribution analyzer module 308 and a report module 310. The entity data module 302 may retrieve stored entity data for processing by the distribution analyzer module 308 or receive entity data from the UI module 304 or from an external source to be stored by the tax analysis system 100. The user interface module 304 may also be used in various embodiments for collecting and displaying data using the wizard module 306, as described in further detail below.

In one embodiment, for each scenario year, the distribution analyzer module 308 receives entity data from the entity data module 302 for each foreign and domestic entity. For example, in referring to FIG. 2, received entity data may include a minimum and a maximum distribution amount for all entities of the hierarchal entity tree 200 (except DE1 202). The distribution analyzer module 308 may then determine the net amount that each entity should pay out each year in order to achieve a target distribution amount at a minimum overall tax cost. The report module 310 may then create one or more reports detailing the analysis. The report data may include one or more of target distribution amount data, entity data, distribution constraints, distribution plans, etc., this and other data are discussed in further detail below. In one embodiment, the report module 310 works in conjunction with the wizard module 306 and the user interface module 304 user to display the report data to a user or format the data for digital transmission (e.g., email, etc.) or physical print out.

In one embodiment, if the foreign entity making the distribution is not a first-tier foreign entity (e.g., separated from the domestic entity by one or several foreign entities, as is the case for each of the foreign entities except CFC1 204 with respect to FIG. 2), the distribution analyzer module 308 automatically creates any induced distributions that these other foreign entities must make in order for the funds to reach the domestic entity (e.g., DE1 202). For each entity, the induced distribution is computed as the distribution amount it receives (net of withholding tax), minus the increase in its foreign income taxes associated with the distribution received.

For example, suppose that CFC4 212 makes a distribution of $100 to CFC2 206 and the distribution is subject to a withholding tax of 5%. If CFC2 206 pays tax at a rate of 10% on the $95 it receives, yielding $9.50; then, the induced distribution of CFC2 206 (made to CFC1) is $95−$9.50=$85.50. If this induced distribution is not subject to a withholding tax, but CFC1 204 pays tax at a rate of 20% on the distribution income it receives, yielding $17 of additional income tax; then, the induced distribution that CFC1 204 makes to DE1 202 is $85.50−$17=$68.50. Although this example is cast in the context of a single currency and a flat tax rate structure for expositional convenience, the distribution analyzer module 308 in other embodiments may accurately take exchange rates and tiered tax rate structures into account when creating induced distributions.

In one embodiment, the distribution analyzer module 308 has an output that includes a list of primary distributions to be created. The distribution analyzer module 308 may automatically create any required induced distributions when the primary distribution is committed to the distribution scenario. For each primary distribution, the distribution analyzer module 308 may, in an example embodiment, provide at least the following information:

1. the year in which the distribution is made;
2. the entity making the distribution;
3. the amount distributed in the entity's FC;
4. the amount distributed in USD;
5. the after tax amount in USD;
6. the incremental tax paid in USD, as well as its breakdown in incremental foreign tax and incremental US tax, both in USD;
7. the marginal tax rate of the distribution, computed as the total additional tax paid in USD, divided by the amount distributed in USD;
8. the amount of additional foreign tax credits (FTC) received if the distribution is made, accounting for the effect of the new distribution on FTC received through subpart F inclusions and existing distributions;
9. the amount of additional FTC utilized if the distribution is made;
10. the increase in the amount of unused FTC associated with the distribution, which may be interpreted as the amount of additional foreign tax credits received if the distribution is made that may not be used in the years modeled in the distribution scenario; and 11. the penalty for the increase in unused FTC associated with the distribution.

In another embodiment, distribution analyzer module 308 may report induced distributions directly as part of the results. In this case, the distribution analyzer module 308 does need to determine the induced distributions associated with selected primary distributions at the time the distribution plan is committed to the distribution scenario, but can commit the induced distributions directly.

Although the information above is provided for a given primary distribution, whose creation is being recommended by the tax analysis application(s) 108, 110 and their associated modules, it does contain the impact of both primary and induced distributions. For instance, in the above example, distribution analyzer module 308's result would be the distribution of $100 made by CFC4, but the incremental foreign tax would be reported as $5+$9.5+$17=$31.5. Thus, distribution analyzer module 308's results provide users with the overall impact of creating a recommended primary distribution and associated induced distributions on their tax position.

Figure 4:
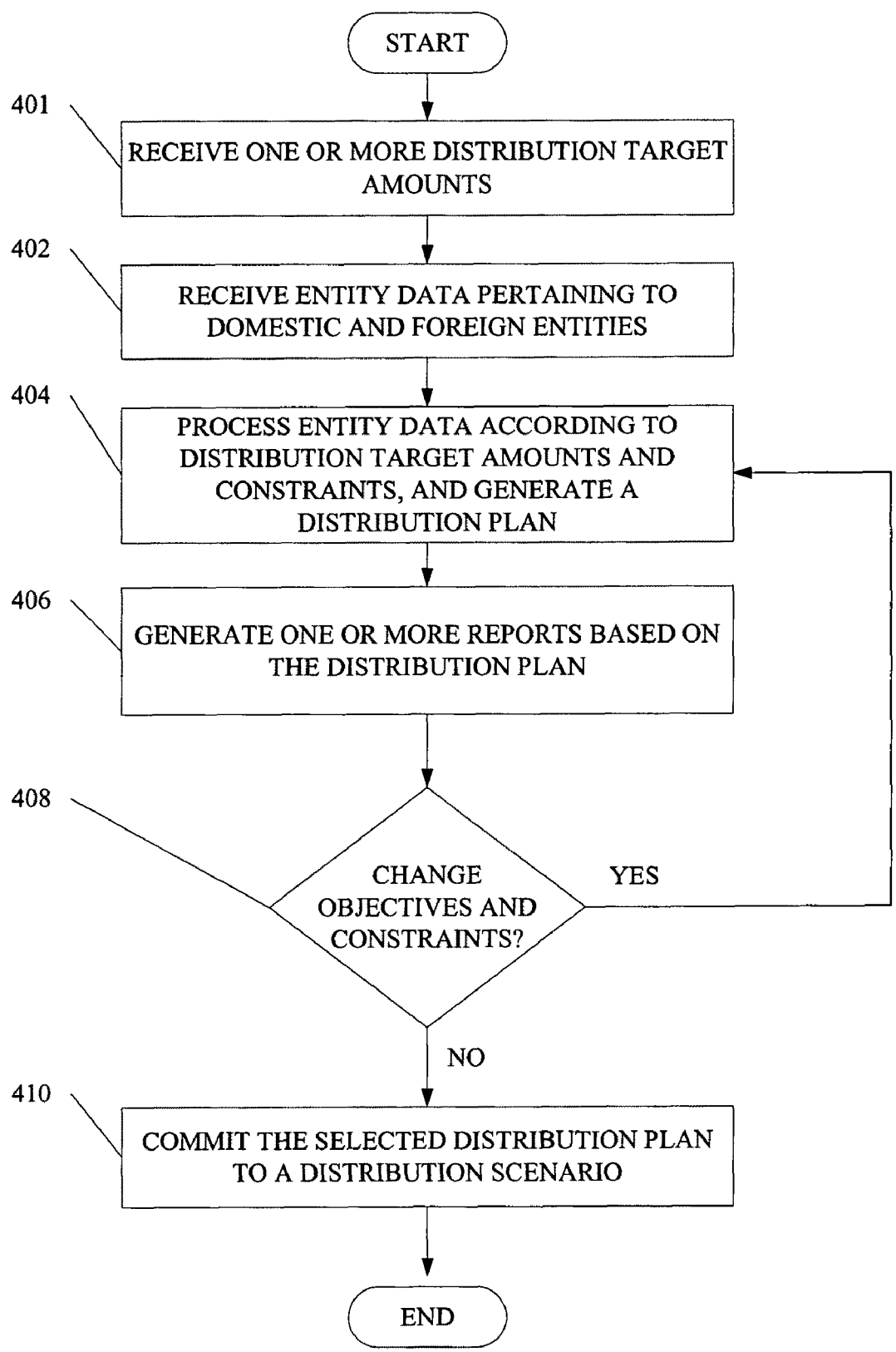
FIG. 4 is a flow chart illustrating at a high level example operations performed by one or more tax analysis application (s) to create a distribution plan.

FIG. 4 is a flow chart illustrating at a high level example operations performed by the tax analysis application(s) 108, 110 to create a distribution plan. At operation 401, receive a target distribution amount corresponding to a desired currency total a domestic entity or the U.S. Consolidated Group (USCG) is to receive from one or more foreign subsidiary entities. At operation 402, receive and process data into the tax analysis system 100. In one embodiment, a distribution scenario may denote a set of data describing tax-relevant attributes of a corporation over a set of years, denoted scenario years. This data may consist of at least a list of domestic and foreign entities, of their US and foreign tax treatment (corporation, branch or partnership), ownership relationships between them, intercompany transactions and existing distributions, the entities' income and expenses during the scenario years in each foreign tax credit separate limitation category (henceforth basket), their beginning of year Earnings and Profits (E&P), Previously Taxed Income (PTI) and Foreign Tax pools by basket, any relevant exchange rates, the tax rules applicable to each foreign entity, the US Consolidated Group's prior year NOL, separate limitation loss (SLL), overall foreign loss (OFL), and Foreign Tax Credit (FTC) balances by basket, the US Consolidated Group's prior year General Business Credit balances, and the US tax rules.

Then at operation 404, process the entity data in accordance with the target distribution amount and constraints (the details of this processing are discussed below) in order to generate a distribution plan. In one embodiment, the target distribution amount and constraints are received from the wizard module 306 in conjunction with distribution analyzer module 308. In another embodiment, the target distribution amount and constraints are retrieved from a local or remote storage location (e.g., a database) over a local or wide area network.

At operation 406, distribution analysis results (which may take the form of a distribution plan) are generated and may be displayed via a user interface and further processed into views and/or reports. In one embodiment, the views and reports may be customizable by a user and the views and reports format may be stored and retrieved by the tax analysis application(s) 108, 110 for subsequent runs. In one embodiment, at operation 408, a wizard may be used to change the objectives and constraints and return to operation 404 to reprocess the entity data, providing the user with additional analysis results. At operation 410, a selected distribution plan (or a subset thereof) may be committed to the distribution scenario.

FIGS. 5-9 are screen shots, according to various embodiments, illustrating a distribution analyzer wizard. In one embodiment, the wizard module 306 of the tax analysis application(s) 108, 110 includes the distribution analyzer wizard, which may perform one or more of the following operations.

Figure 5:
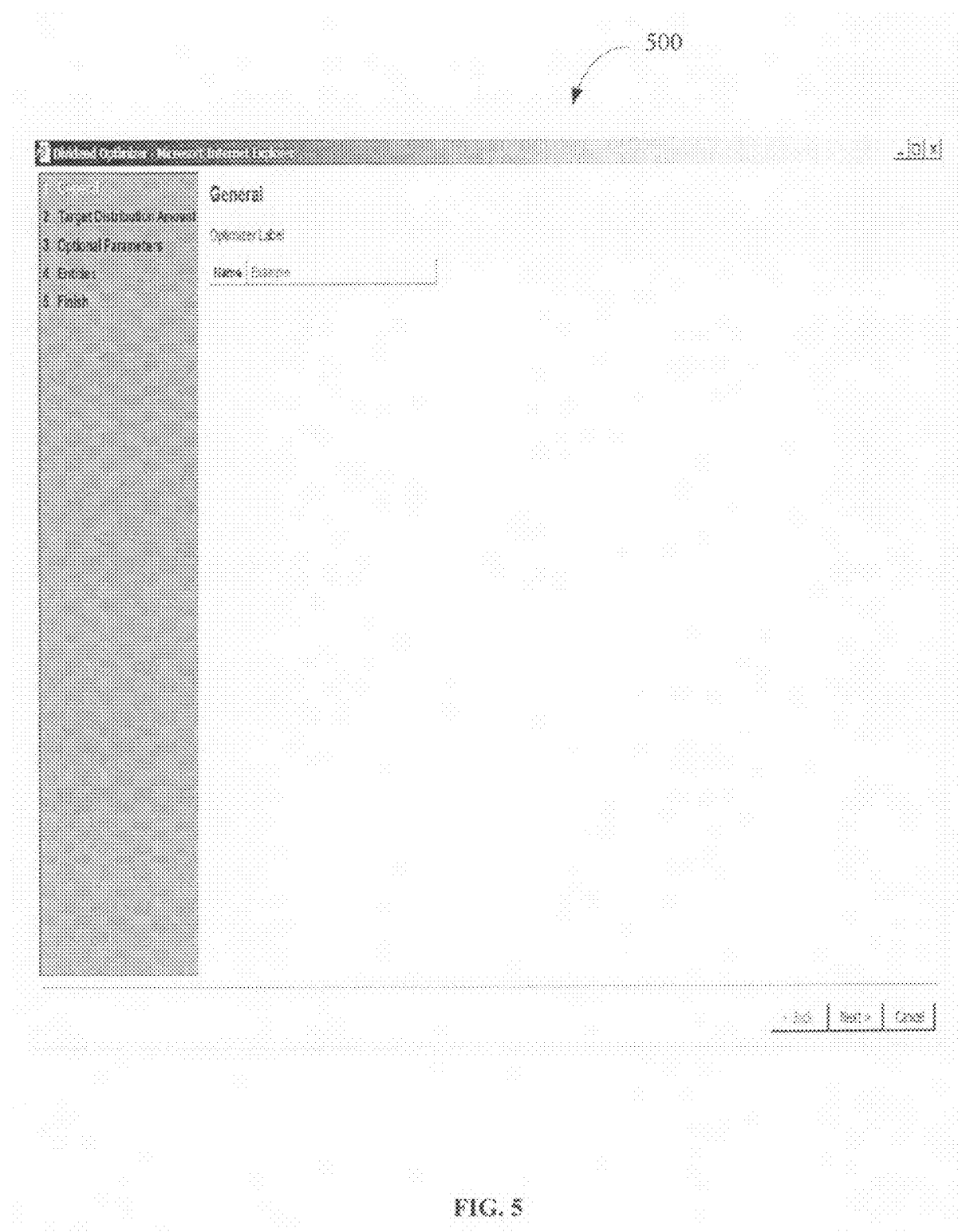
FIGS. 5-9 are screen shots, according to various embodiments, illustrating a distribution analyzer wizard.

Operation one includes the selection of a distribution analysis identifier (label). FIG. 5 is a screen shot 500 of an example embodiment of an interface of the distribution analyzer wizard used to select a label for the run. The user may be allowed to perform several distribution analysis runs under different labels on the same underlying scenario. The results may then be reviewed prior to making a decision on which distribution strategy to use.

Figure 6:
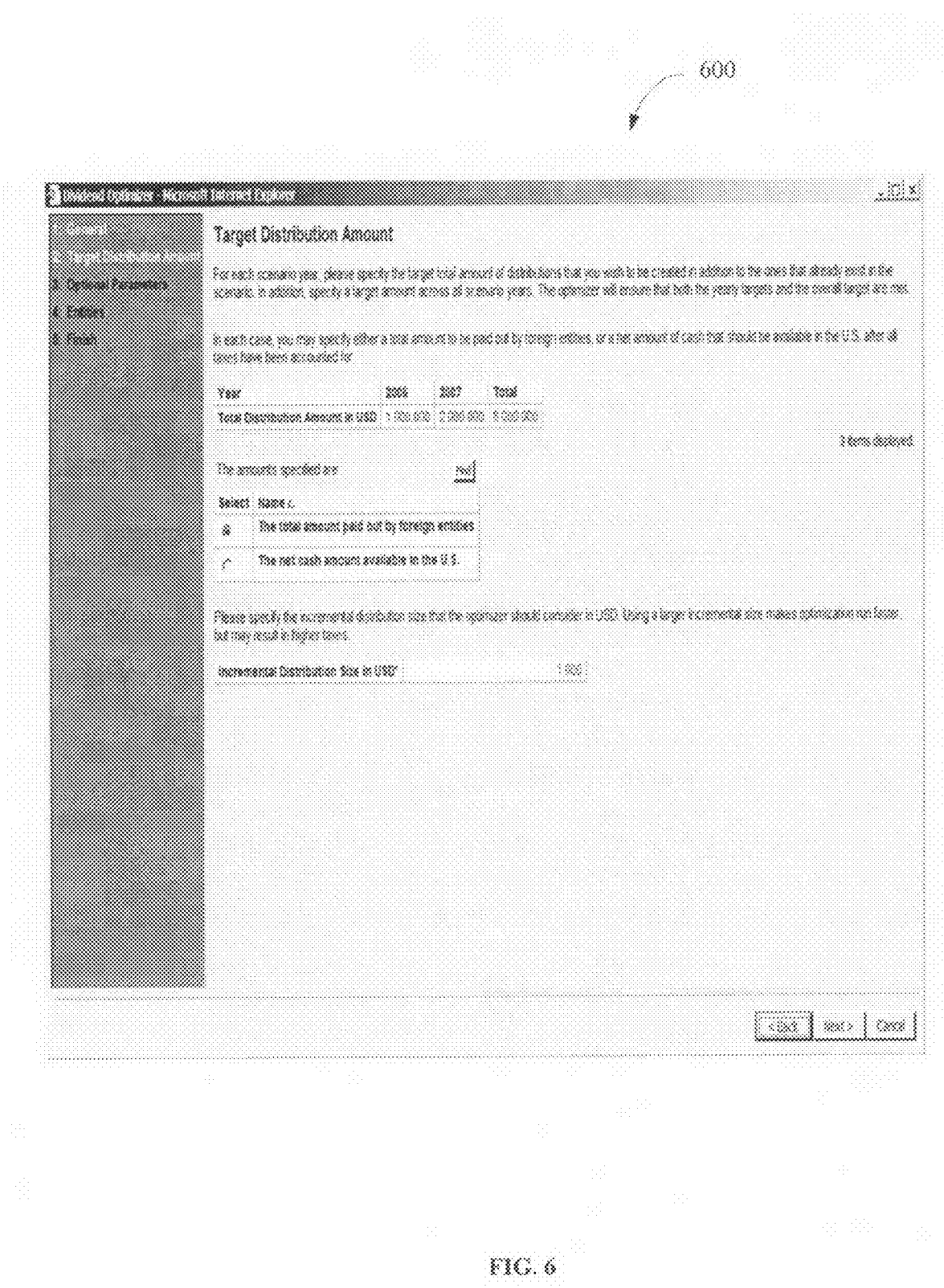

Operation two of the distribution analyzer wizard allows for a user to specify the total amount of distributions to be created. FIG. 6 is a screen shot 600 of an example embodiment where the user may specify either a total amount that should be paid out by foreign entities, or a total after-tax amount that should be received by the US Consolidated Group, as well as the incremental distribution size. When the user clicks on the "Next" button illustrated at the bottom of the screen shot 600, the distribution analyzer wizard may ensure that all values entered by the user are nonnegative and requires the user to correct any negative value. However, the distribution analyzer wizard does not need to check that the total target amount is at least as large as the sum of the amounts for the individual years. If this condition is not met, the total across years is a non-binding constraint.

Figure 7:
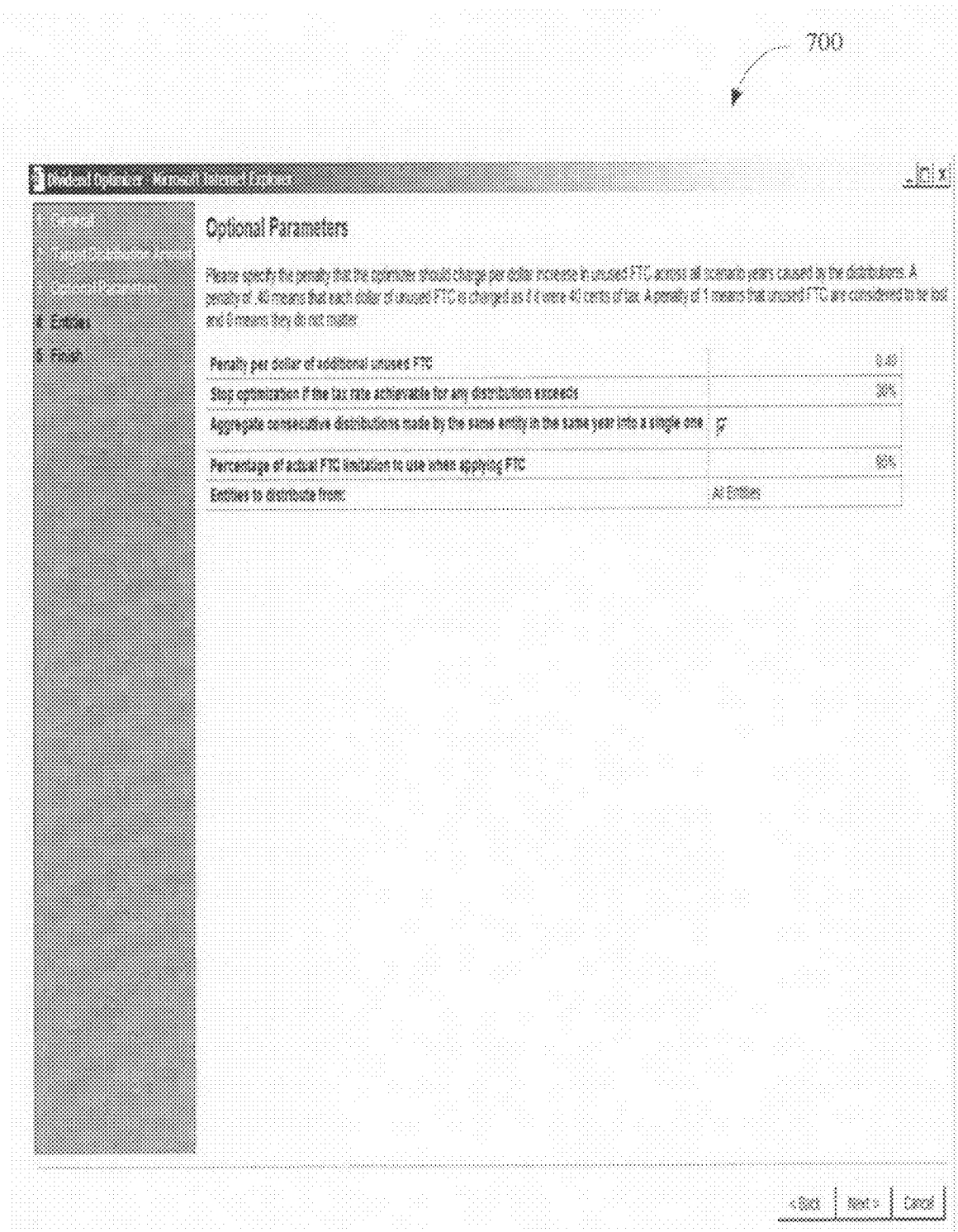

Operation three includes a selection of optional parameters for the distribution analysis. In one embodiment, the optional parameters are used to drive the behavior of the distribution analysis. FIG. 7 is a screen shot 700 of an example distribution analyzer wizard interface for entering the optional parameters. The optional parameters may include but are not limited to: (1) the penalty per dollar of additional unused FTC, (2) whether to stop the optimization if the tax rate achievable for any distribution exceeds a certain value, (3) whether to aggregate consecutive distributions made by the same entity in the same year into a single one when displaying the results to the user, (4) the percentage of the actual FTC limitation to use in the tax calculations when applying FTC, and (5) the group of entities to distribute from, which can be either all entities in the distribution scenario or a subset thereof.

Figure 8:
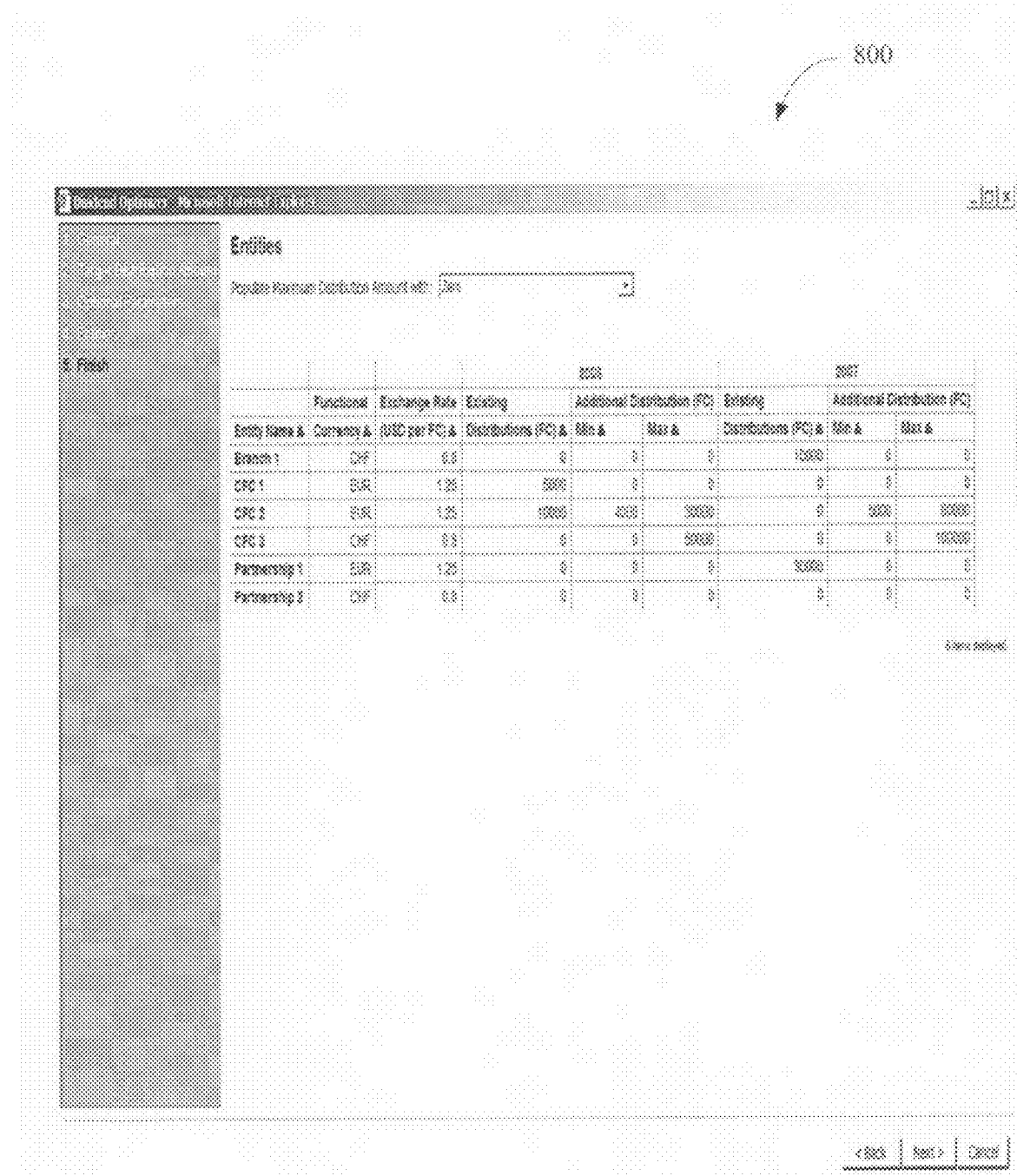

Operation four includes the selection of the distribution constraints for foreign entities. This operation allows the user to specify which foreign entities the system should consider when creating distributions. FIG. 8 is a screenshot 800 of an example embodiment of an interface of the distribution analyzer wizard listing all foreign entities selected in operation three. For each foreign entity, the list includes: its functional currency (FC), the exchange rate from its FC to U.S. Dollars (USD) (which may be captured elsewhere in the system in order to avoid users' having to enter this information multiple times), and the amount of distributions that already exist in the system. The user inputs the minimum additional amount that should be distributed, and the maximum additional amount that may be distributed by each entity. Each of these values may be pre-filled with zeros in the distribution analyzer wizard. The minimum and maximum cells may be editable.

The user may instruct the distribution analyzer wizard to populate the maximum distribution amounts from a category of income drop down box. The options that display in the drop down may be zero (the default), "PTI E&P", "Non-PTI E&P", "PTI plus Non-PTI E&P", "Cash", and "Lesser of PTI plus Non-PTI E&P and Cash."

Returning to FIG. 8, in various embodiments, the columns in the table (in screenshot 800) may be sorted, as indicated by the symbol Δ.

In this example, the values shown for the year 2006 in FIG. 8 are interpreted as follows:

- CFC1 already distributes a total of EUR 5,000 in 2006. The user does not wish any additional distributions to be created, so he/she specifies both the lower bound and the upper bound to be zero (see FIG. 2 for examples of CFC1-3).
- CFC2 already distributes a total of EUR 10,000 in 2006. The user wants the distribution analyzer to create an additional distribution of EUR 4,000 and to consider an additional distribution of up to EUR 30,000. The amount of 4,000 is mandatory, while the amount between 4,000 and 30,000 is optional; it may be distributed or not, depending on how the tax cost of doing so compares to that of other entities.
- CFC3 does not make any distribution in 2006. The user does not mandate the distribution analyzer to create any distribution, but requires it to consider creating a distribution of up to CHF 50,000, depending on how the tax cost of doing so compares to that of other entities.

In one embodiment (not shown in FIG. 8), the last row in the table lists the total amount of distributions converted to USD. For existing distributions, the actual exchange rates (input by the user when creating the distributions) may be used, while the lower and upper bounds may be converted using the exchange rate shown in the table (captured at the scenario level, as described below).

When a user clicks to proceed to the next operation, the distribution analyzer wizard ensures that for each year, the sum of the upper bounds, converted to USD, exceeds the target distribution amount specified for that year in operation 2. In addition, it ensures that the sum of the upper bounds for all entities across all years exceeds the total target distribution amount across all years. If either of these conditions is not met, the distribution analyzer wizard may warn the user that the target distribution amount is not achievable. The warning message may read: "The maximum additional distribution amounts you have selected are too low to achieve your target distribution amount. Please increase them or lower your target." The user may be offered the following two options: "Return to Operation four" and "Proceed to Operation five." In one embodiment, if the user chooses to proceed to operation five, the distribution analyzer will run, but will not achieve the target distribution amount.

In addition, in one embodiment, the distribution analyzer wizard may make certain that the maximum distribution amount is greater than or equal to the minimum for every entity. If this condition is not met, it may not allow the user to proceed to the next operation. The rows corresponding to entities for which the minimum exceeds the maximum may be highlighted and the following message displayed: "Please ensure the entities in red have maximum distribution amounts that exceed the minimum amounts."

Figure 9:
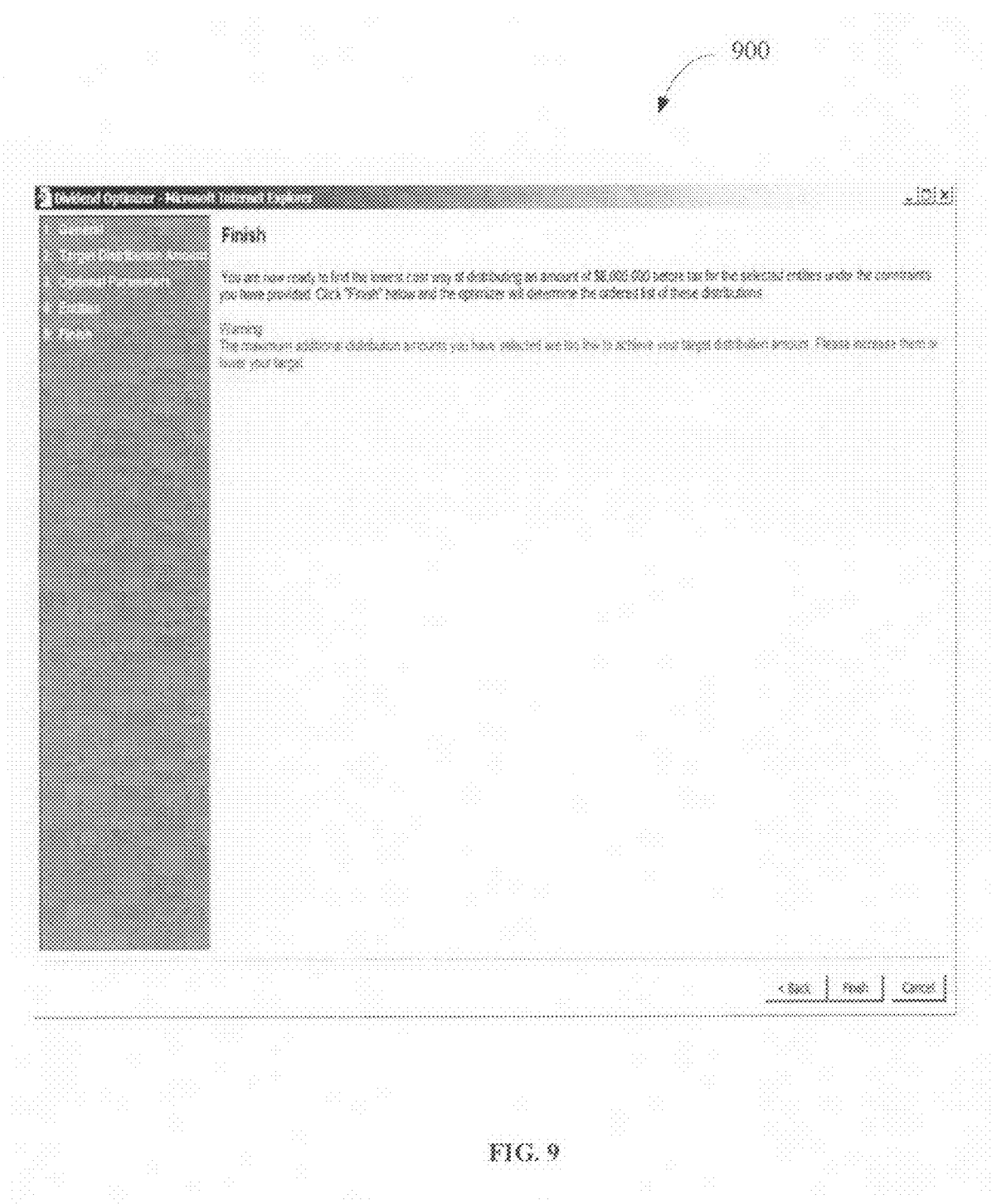

FIG. 9 illustrates an example embodiment of the fifth operation, the finish of the distribution analyzer wizard. The fifth operation permits the user to confirm the start of a distribution analysis.

In other embodiments, additional optimization-specific data may be used by the distribution analyzer. Besides the data captured by the distribution analyzer wizard described above with reference to FIGS. 6-8, additional analysis-specific data may be captured at the scenario level. This data may include default values that may be used by the distribution analyzer for newly created distributions made out of each entity. These default values may be captured at the same place as ownership data in the system (for example, on the ownership tab of the system's user interface), as each except one (the exchange rate from the entity's FC to USD) may be captured separately for each owner.

Figure 11:
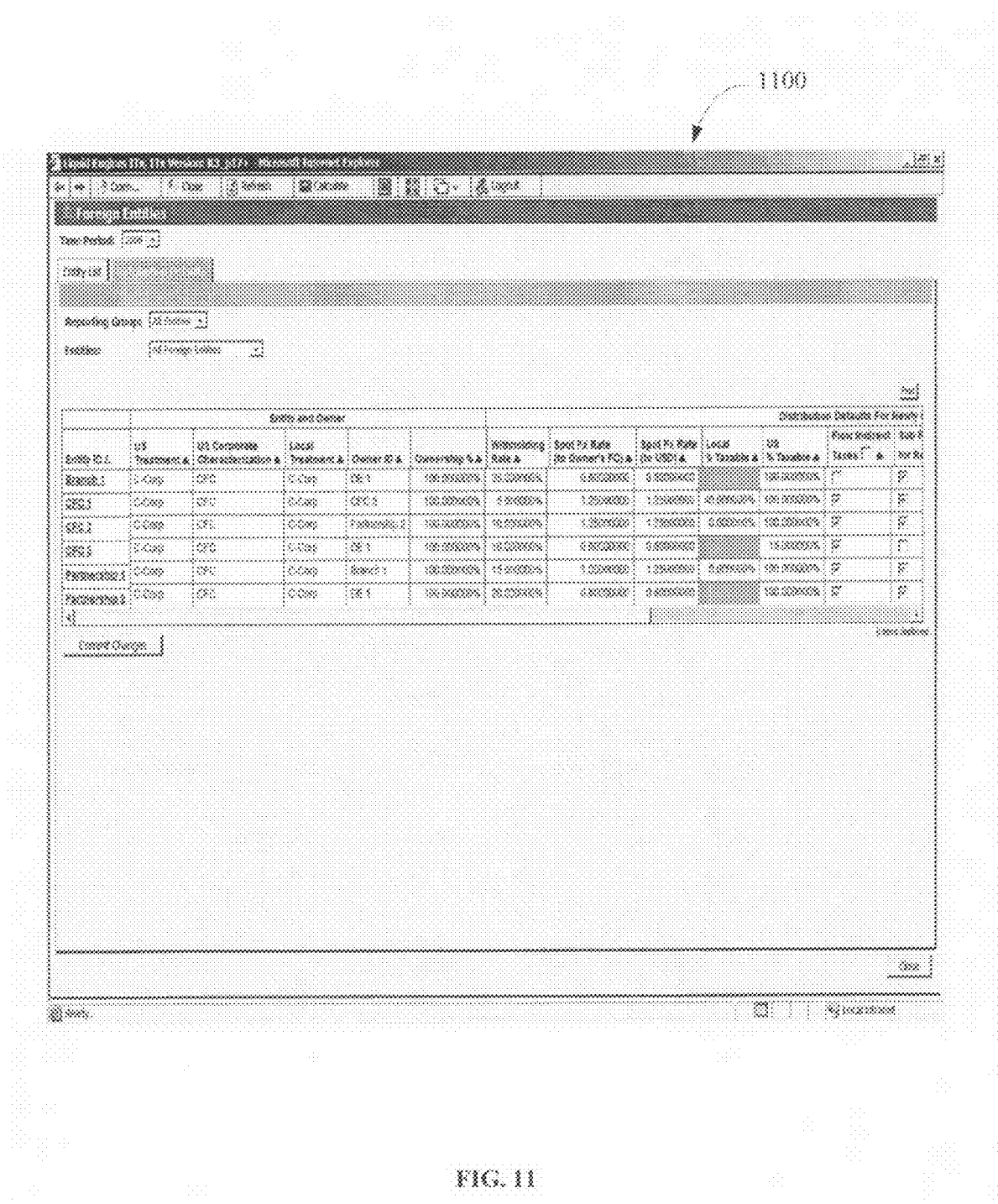
FIG. 11 an example screenshot illustrating, according to one embodiment, default values that may be captured and displayed on a user interface.

FIG. 10 illustrates an example embodiment of a table 1000 of default values associated with distribution analysis-specific data. For example, these default values may be captured on a dedicated screen in the user interface, of which an example screenshot 1100 is shown in FIG. 11. In addition, they may be printed out or captured in a report. The table 1000 includes a data element column 1002, a default values column 1004, a foreign treatment column 1006, and a U.S. treatment column 1008. Among various embodiments, the data captured may vary and depend on the entity's foreign and US treatments. In the example shown in FIG. 10, if any of the attributes marked with an "X" is an attribute of the entity, the corresponding data element is captured. If an entity is a partnership for foreign purposes and a corporation for US purposes, then the exchange rate from its FC to each of its owners' FC is captured. The table in FIG. 10 also reports the default value for each item used in one embodiment of the distribution analyzer.

The distribution analyzer may include one or more algorithms to generate the optimized distribution result and associated views and reports. In one example embodiment, the algorithm includes the following operations:

1. Compute the foreign income tax converted to USD and the US tax in the initial situation (e.g., prior to creating any distributions, but incorporating the effect of any distributions that already exist in the distribution scenario).
2. For each scenario year, go through each foreign entity. If its lower bound for the scenario year in question is positive:
   a. Create a primary distribution (of an amount equal to the lower bound) out of this entity in that year.
   b. Create any induced distributions up the ownership tree.
   c. Compute the foreign income tax converted to USD and the US tax liability.
   d. Compute the additional tax associated with the distribution as the sum of
      i. the increase in foreign income tax, converted to USD;
      ii. the withholding tax from the primary distribution and any induced distributions, converted to USD; and
      iii. the increase in US tax.
   e. Compute the tax rate associated with the distribution as the ratio of the additional tax from (d) and the distribution amount from (a), converted to USD.
   f. Compute the rate of the penalty for unused foreign tax credits (FTC) associated with the distribution as the increase in unused FTC (computed as the increase in FTC received minus the increase in FTC utilized at the USCG level), times the penalty coefficient entered by the user, divided by the distribution amount in USD.
   g. Prepare the information to be returned to the user, for example, add a new entry containing the following information to the list of results:
      i. the year in which the distribution is made;
      ii. the entity making the distribution;
      iii. the amount distributed in the entity's FC;

iv. the amount distributed in USD;
v. the after tax amount in USD;
vi. the marginal tax rate of the distribution;
vii. the tax paid in USD, as well as its breakdown in incremental foreign tax and incremental US tax;
viii. the increase in the amount of FTC received if the distribution is made;
ix. the amount of additional FTC utilized if the distribution is made;
x. the increase in the amount of unused FTC associated with the distribution; and
xi. the penalty for the increase in unused FTC associated with the distribution.
h. Reduce the upper distribution bound for the entity in the year by the amount distributed. In other words, subtract the lower bound for the entity in the year from the upper bound for the entity in the year.
i. Increase the total amount distributed in the year and the total amount distributed across each of the years by the amount distributed.
3. In order to account for the fact that amounts not distributed in a given year may be rolled over to subsequent years, compute the cumulative upper bound for each scenario year as the sum of the upper bounds for each of the years up to and including the year considered. More specifically:
a. For the first scenario year, let the cumulative upper bound for each entity be equal to the upper bound.
b. For each scenario year from the second to the last, set the cumulative upper bound for each entity to equal the sum of the upper bound for the year and the cumulative upper bound for the previous year.
4. Perform analysis as follows:
a. Compute the foreign income tax paid by each entity in each scenario year.
b. Set the best tax rate and the best penalty rate for unused FTC found so far to some very large amount (e.g., 100 each).
c. For each scenario year, if either (1) the target total distribution amount for that year has not been achieved or (2) the total amount of distributions that remain to be created across all scenario years exceeds the amount that will be created in order to meet the distribution targets in other scenario years, go through each foreign entity. If its cumulative upper bound is positive:
  i. Create a primary distribution out of this entity in that year. The amount of the distribution in the entity's FC is the lesser of the cumulative upper bound (which is already in FC) and the incremental distribution size (converted to FC using the appropriate exchange rate).
  ii. Create any induced distributions in the year.
  iii. Compute the foreign income tax converted to USD and the US tax liability.
  iv. Compute the additional tax associated with the distribution as the sum of:
    1. the increase in foreign income tax, converted to USD;
    2. the withholding tax from the primary distribution and any induced distributions, converted to USD; and
    3. the increase in US tax.
  v. Compute the tax rate associated with the distribution as the ratio of the additional tax from (iv) and the distribution amount from (i), converted to USD.
  vi. Compute the rate of the penalty for unused FTC associated with the distribution as the increase in unused FTC (computed as the increase in FTC received minus the increase in FTC utilized at the USCG level), times the penalty coefficient entered by the user, divided by the distribution amount in USD.
  vii. If the sum of the tax rate and the penalty rate is strictly lower than the sum of the best tax rate and the best penalty rate:
    1. Mark the current year as being the best year and the current entity as being the best entity;
    2. Set the best tax rate to equal the tax rate of the current entity and the best penalty rate to equal the penalty rate of the current entity;
    3. Store the amount of the primary distribution and each of the induced distributions, in FC.
    4. Store all the information required in order to prepare the list of results to be presented to the user.
    Note that since the test is for strict inequality, if there is a tie between several distributions in terms of tax and penalty rates, this approach automatically results in distributions made in early years being preferred. (Explicit tie-breaking rules, such as the amount of cash available in a given entity, may be implemented in this operation of the algorithm.)
  viii. Remove the primary distribution created in operation (i) as well as any induced distributions created in operation (ii).
d. Create the primary distribution and any induced distributions out of the best entity in the best year. Add a new entry containing the following information to the list of results:
  i. the year in which the distribution is made;
  ii. the entity making the distribution;
  iii. the amount distributed in the entity's FC;
  iv. the amount distributed in USD;
  v. the after tax amount in USD;
  vi. the marginal tax rate of the distribution;
  vii. the tax paid in USD, as well as its breakdown in incremental foreign tax and incremental US tax;
  viii. the increase in the amount of foreign tax credits (FTC) received if the distribution is made;
  ix. the amount of additional FTC utilized if the distribution is made;
  x. the increase in the amount of unused FTC associated with the distribution; and
  xi. the penalty for the increase in unused FTC associated with the distribution.
e. If the user has requested that optimization be aborted if the tax rate from the distribution exceeds a given value and that value is exceeded, optimization is complete. Continue directly to operation (5).
f. Increase the total amount distributed in the year and the total amount distributed across all scenario years by the amount of the distribution in USD.
g. Reduce the upper bound and the cumulative upper bound of the entity making the distribution to reflect the newly created distribution, as follows:
  i. Set the amount by which the upper bounds will need to be reduced in total (henceforth called the amount needed) to equal the amount of the distribution in FC.
  ii. For each year from the best year until the first scenario year, 1. Reduce the cumulative upper bound of the entity making the distribution in the year by the amount needed.
2. Let the amount found be the lesser of the amount needed and the upper bound for the year.
3. Reduce the upper bound in the year by the amount found.
4. Reduce the amount needed by the amount found.
     iii. For each year from the best year until the last scenario year, reduce the cumulative upper bound of the entity making the distribution by the amount of the distribution in FC.
   h. If
     i. the sum of the cumulative upper bounds across all entities in the last scenario year is zero, or
     ii. (1) the total amount distributed over all years is greater than or equal to the target amount over all years, and (2) the total amount distributed in each of the years is greater than or equal to the target amount for that year or the sum of the cumulative upper bounds across all entities for that year is zero, optimization is complete. Continue to operation (5). Otherwise, go to operation (a).
5. If the user has requested that distributions made by the same entity in the same year be aggregated, go through the list of distributions to be created and identify the sets of consecutive distributions made by the same entity in the same year. For each such set:
   a. Compute the data to be returned to the user for the aggregated distribution:
     i. The aggregated distribution's exchange rate is equal to the exchange rate of any of the distributions in the set being aggregated.
     ii. The data expressed in monetary units (distribution, FTC and tax amounts) is the sum of the data for the distributions in the set.
     iii. The data expressed in percentages (tax rate and unused FTC penalty) may be computed using the amounts from (ii).
   b. Remove the distributions being aggregated from the set of results and replace them with the aggregated distribution.
6. Return the list of distributions to be created and their properties to the user.

In various embodiments, to improve accuracy and performance, the algorithm presented above may be extended. In particular, instead of being user-entered, the size of the incremental distribution may be computed automatically by the distribution analyzer. The following optional operations may be used alone or in combination:

Compute the incremental distribution size as a function of the total amount to be distributed. The value may be either common across years or year-specific, e.g., based on the total amount that remains to be distributed in the year being analyzed.

The size of the incremental distribution may also be adjusted dynamically as the optimization proceeds. For example:
   i. It may be set to a certain fraction of the total distribution amount that remains to be optimized (subject to a lower bound that ensures that optimization completes). This approach results in the incremental distribution size decreasing through time up to its lower bound, and remaining constant thereafter.
   ii. It may be varied depending on the cross-sectional standard deviation of the tax and penalty rates across all entities or across a subset of entities (such as the N entities with the lowest tax and penalty rates). The standard deviation measures the degree of heterogeneity across entities. Other things equal, the larger the standard deviation, the larger the operation size that may be used.
   iii. It may be varied depending on the time series variation of the tax and penalty rates for the different entities, or for a subset of entities (such as the N entities with the lowest tax and penalty rates). This variation measures how quickly the tax impact of the distributions is changing as additional distributions are created by the system. Other things equal, the higher the variation, the lower the incremental distribution size that should be used.
   iv. It may be varied using the ratio of the cross-sectional standard deviation to the time series variation.

The size of the incremental distribution may be varied across entities. For instance, it may be a function of the maximum amount that is available to be distributed out of each entity, such as a certain percentage of the upper bound or of the cumulative upper bound (again, subject to a lower bound that ensures that optimization completes).

In another embodiment, the algorithm may be parallelized (multi-threaded). In step (4)(c) of the algorithm, the Distribution Analyzer identifies all year/entity pairs for which the cumulative upper bound is positive then divides this set into equally large subsets, one per available thread. In each subset, the best year/entity combination is determined by following the logic in steps (4)(c)(i)-(4)(c)(viii). After the best combination in each subset has been identified, the best combination across subsets is selected and the process continues with step (4)(d).

In one embodiment, in order to measure the tax cost of the distribution accurately in cases where less than 100% of some or all foreign entities is ultimately included in the USCG (partial ownership), it suffices to; (1) multiply the additional foreign income tax associated with the distributions received by each entity with those entities' ultimate inclusion percentage in the USCG; (2) multiply the additional withholding tax paid by each entity with those entities' ultimate inclusion percentage in the USCG; and (3) multiply the amount of the primary distribution with the distributing entity's ultimate inclusion percentage in the USCG. Once these adjustments have been made, the marginal tax cost of the distribution may again be computed as the sum of additional foreign income tax, additional withholding tax, and additional US tax, divided by the amount of the primary distribution (all measured in USD). Similarly, the unused FTC penalty can be computed accurately by multiplying the amount of the primary distribution with the distributing entity's ultimate inclusion percentage in the USCG. In various embodiments, the size of the incremental distributions considered by the optimizer may be increased in proportion to the inverse of the distributing entity's ultimate inclusion percentage in the USCG. Furthermore, both the raw and inclusion percentage-adjusted distribution amounts may be reported to the user as part of the results.

FIG. 12 illustrates an example embodiment of a screenshot 1200 of an example set of results returned by the distribution analyzer. The results may also include corresponding cumulative values. In one embodiment, the distribution analyzer returns a list of (incremental) distributions that may be made in a step-wise fashion. In addition to the year in which the distribution is made, the entity making the distribution and the amount paid out in FC, it reports, for each distribution, the corresponding amount in USD, the amount of cash from the distribution available in the US after taxes have been paid, the marginal tax rate of the distribution, the amount of additional taxes paid in USD, broken down in foreign (income and withholding) tax and US tax, the amount of FTC received with the distribution, the amount of FTC utilized, and the penalty for unused FTC.

In one embodiment, the user may sort the results, such as the results shown in FIG. 12, based on the values in the various columns. In one embodiment, if the user sorts using any criterion other than operation number, the operation number is used as the secondary sort criterion.

When a user selects one of the checkboxes in the table illustrated in FIG. 12, each of the checkboxes above it may be selected automatically. The user may then be able to uncheck boxes individually.

In one embodiment, two buttons are shown below the table (e.g., see FIG. 12), "Commit" and "Re-estimate." If the user clicks on "Commit," each of the operations selected may be committed to the distribution scenario (e.g., the selected distributions plus any induced distributions may be created in the system), and the distribution scenario is recalculated.

FIG. 13 illustrates an example embodiment of a table 1300 generated when "Re-estimate" has been selected. When "Re-estimate" has been selected, a method (function) similar to the distribution analyzer but taking the selected distributions as an additional input is called. This method returns the updated values for each operation selected. The results page is then redrawn and displays the updated values for the selected operations. Rows corresponding to operations that have not been selected show the old values for columns up to and including "Pre-Tax USD" in grey; other cells may be grayed out (an illustration is shown in FIG. 13; note the contrast with the table that is illustrated in FIG. 12). The user may uncheck previously selected operations and/or select additional operations individually (e.g., selecting an additional checkbox will not automatically select each of the checkboxes above it), and again either commit or re-estimate. The distribution analyzer input data is kept in memory until "Commit" has been selected. This guarantees that the user may re-estimate the results or a subset of results as many times as desired. If the underlying scenario data is modified or the user logs out of the system and logs back in, "Re-estimate" remains available to the user. The system only needs to reload the data before calling the method described above.

Figure 14:
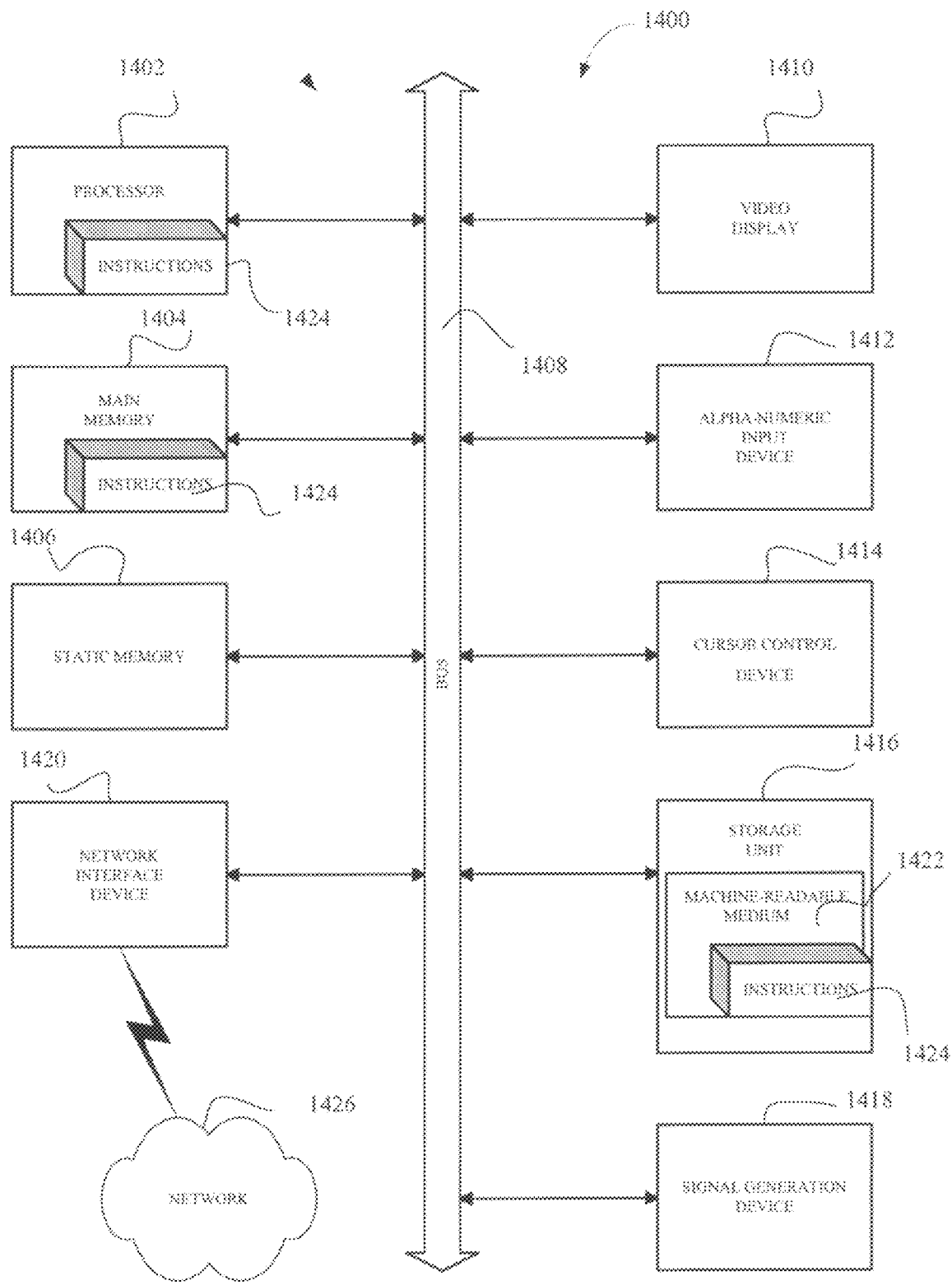
FIG. 14 illustrates a diagrammatic representation of a machine in an example form of a computer system within which a set of instructions may be executed to cause the machine to perform any one or more of the methodologies discussed herein.

FIG. 14 illustrates a diagrammatic representation of a machine in an example form of a computer system 1400 within which a set of instructions may be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1400 includes a processor 1402 (e.g., a central processing unit (CPU) a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a storage unit 1416 (e.g., hard-disk drive), a signal generation device 1418 (e.g., a speaker) and a network interface device 1420.

The storage unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media. The software 1424 may further be transmitted or received over a network 1426 via the network interface device 1420.

While the machine-readable medium 1422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

I claim:

1. A computer-implemented method, including:

receiving by a computer-based system user-defined inputs representing one or more target distribution amounts corresponding to currency totals for one or more foreign entities to distribute to one or more domestic entities in one or more years, the one or more foreign entities being direct or indirect subsidiaries of the one or more domestic entities;

receiving and storing by the computer-based system electronic entity data pertaining to tax relevant attributes for the one or more domestic and foreign entities over the one or more years;

receiving by the computer-based system user-defined inputs representing distribution constraints for each foreign entity, the distribution constraints including a minimum distribution amount and a maximum distribution amount for each foreign entity in each year;

creating by the computer-based system outputs representing one or more distribution scenarios including corresponding tax costs based on the entity data and the distribution constraints; and identifying by the computer-based system a distribution scenario from the one or more distribution scenarios having a lowest tax and meeting the one or more target distribution amounts.

2. The method of claim 1, including receiving the target amounts, the entity data, and the distribution constraints from a user interface.

3. The method of claim 1, including converting each distribution amount to a currency of the domestic entity.

4. The method of claim 1, including determining the maximum distribution amount is too low when the one or more distribution scenarios include an amount less than the one or more target distribution amounts.

5. The method of claim 1, including determining the maximum distribution amount is equal to or greater than the minimum distribution amount for each entity in each year.

6. The method of claim 1, wherein creating a distribution scenario of the one or more distribution scenarios includes:
creating a primary distribution out of an entity in a given year, an amount of the primary distribution in a functional currency of the entity being equal to the lesser of an amount available in the entity in the given year and an incremental distribution size;
creating induced distributions in the year by moving up an entity ownership structure;
determining an additional tax associated with the primary distribution as a sum of one or more of an increase in foreign income tax, a withholding tax from the primary distribution, any induced distributions, and an increase in U.S. (United States) tax; and
determining a tax rate associated with the primary distribution as a ratio of additional tax from the computing of the additional tax associated with the distribution and the distribution amount from the creating of the primary distribution.

7. The method of claim 1, wherein the identifying which of the one or more distribution scenarios has the lowest tax cost includes determining, in each year, a tax cost of an incremental distribution out of each entity that has distributed less than its maximum distribution amount for that year.

8. The method of claim 7, wherein the identifying which of the distribution scenarios has the lowest tax cost includes selecting an incremental distribution with the lowest tax cost until all the one or more target distribution amounts have been achieved or determining it is not possible to get closer to meeting the one or more target distribution amounts.

9. The method of claim 7, including adding a penalty for unused foreign tax credits to the tax cost when selecting which incremental distribution to create.

10. The method of claim 1, wherein the identifying which of the one or more distribution scenarios has the lowest tax cost includes determining, in each year, a set of foreign income taxes and a set of withholding taxes associated with the one or more foreign entities and a set of income tax amounts associated with the one or more domestic entities, and further comprising receiving a first target distribution amount associated with a first domestic entity and a second target distribution amount associated with a second domestic entity, wherein a first set of foreign entities is associated with the first domestic entity and a second set of foreign entities is associated with the second domestic entity.

11. The method of claim 10, wherein a combined target distribution amount comprising the first and second distribution amounts is used in association with a consolidated entity group comprising the first and second domestic entities, the combined target distribution representing a total distribution that the one or more domestic entities receive from the one or more foreign entities.

12. The method of claim 1, wherein the one or more foreign entities comprises a plurality of foreign entities and the identifying which of the one or more distribution scenarios has the lowest tax cost includes determining, in each year, a set of foreign income taxes and a set of withholding taxes associated with the plurality of foreign entities and a set of income taxes associated with the one or more domestic entities.

13. The method of claim 12, wherein the plurality of foreign entities includes a first foreign entity and a second foreign entity and wherein the method is used to determine a multi-tier distribution, the method further comprising:
determining a first distribution of the first foreign entity for distribution to the one or more domestic entities, including determining income and withholding tax values subject to the first foreign entity, and, wherein the first distribution must go through a second foreign entity before being passed up in a form of a second distribution from the second foreign entity to the one or more domestic entities, determining income and withholding tax values associated with the second foreign entity, including on the first distribution, to determine an amount available for distribution to the one or more domestic entities in the second distribution.

14. A system, including:
a computer-based system comprising an input adapted to receive user-defined inputs, a processor adapted to process executable code and user-defined inputs and a memory adapted to store the executable code and user-defined inputs, the executable code comprising:
an entity data module being executable by the processor and being adapted to receive one or more user-defined inputs representing target distribution amounts corresponding to currency totals for one or more foreign entities to distribute to one or more domestic entities in one or more years, the one or more foreign entities being direct or indirect subsidiaries of the one or more domestic entities; to receive entity data pertaining to tax relevant attributes for the one or more domestic and foreign entities over the one or more years; and to receive user-defined inputs representing distribution constraints for each foreign entity, the distribution constraints including a minimum distribution amount and a maximum distribution amount for each foreign entity in each year; and
a distribution analyzer module being executable by the processor and being adapted to create one or more distribution scenarios including corresponding tax costs based on the entity data and the distribution constraints and to identify a distribution scenario from the one or more distribution scenarios having a lowest tax and meeting the one or more target distribution amounts.

15. The system of claim 14, wherein the entity data module is further adapted to receive the target amounts, the entity data, and the distribution constraints from a user interface.

16. The system of claim 14, wherein the distribution analyzer module is further adapted to convert each distribution amount to a currency of the domestic entity.

17. The system of claim 14, wherein the distribution analyzer module is further adapted to determine the maximum distribution amount is too low when the one or more distribution scenarios include an amount less than the one or more target distribution amounts.

18. The system of claim 14, wherein the distribution analyzer module is further adapted to determine the maximum distribution amount is equal to or greater than the minimum distribution amount for each entity in each year.

19. The system of claim 14, wherein the distribution analyzer module is further adapted to:
create a primary distribution out of an entity in a given year, an amount of the primary distribution in a functional currency of the entity being equal to the lesser of an amount available in the entity in the given year and an incremental distribution size;

create induced distributions in the year by moving up an entity ownership structure;

determine an additional tax associated with the primary distribution as a sum of one or more of an increase in foreign income tax, a withholding tax from the primary distribution, any induced distributions, and an increase in U.S. (United States) tax; and determine a tax rate associated with the primary distribution as a ratio of additional tax from the computing of the additional tax associated with the distribution and the distribution amount from the creating of the primary distribution.

20. The system of claim 14, wherein the distribution analyzer module is further adapted to determine, in each year, a tax cost of an incremental distribution out of each entity that has distributed less than its maximum distribution amount for that year.

21. The system of claim 20, wherein the distribution analyzer module is further adapted to select an incremental distribution with the lowest tax cost until all the one or more target distribution amounts have been achieved or the distribution analyzer module to determine it is not possible to get closer to meeting the one or more target distribution amounts.

22. The system of claim 20, wherein the distribution analyzer module is further adapted to add a penalty for unused foreign tax credits to the tax cost when selecting which incremental distribution to create.

23. The system of claim 14, including a report module adapted to create a report composed of at least the identified distribution scenario from the one or more distribution scenarios having the lowest tax and meeting the one or more target distribution amounts.

24. The system of claim 14, wherein the one or more foreign entities comprises a plurality of foreign entities and the distribution analyzer module is adapted to create one or more distribution scenarios based at least in part on, for each year, a set of foreign income taxes and a set of withholding taxes associated with the plurality of foreign entities and a set of income taxes associated with the one or more domestic entities.

25. The system of claim 24, wherein the plurality of foreign entities includes a first foreign entity and a second foreign entity and wherein the distribution analyzer module is adapted to create one or more multi-tier distribution scenarios, the distribution analyzer module being further adapted to determine a first distribution of the first foreign entity for distribution to the one or more domestic entities, determine income and withholding tax values subject to the first foreign entity in a first jurisdiction, determine income and withholding tax values associated with the second foreign entity in a second foreign jurisdiction, including on the first distribution, and determine an amount available for distribution from the second foreign entity to the one or more domestic entities in a form of a second distribution.

26. A non-transitory machine-readable medium that stores instructions to be executed by a machine, the instructions when executed causing the machine to:
receive one or more target distribution amounts corresponding to currency totals for one or more foreign entities to distribute to one or more domestic entities in one or more years, the one or more foreign entities being direct or indirect subsidiaries of the one or more domestic entities;
receive entity data pertaining to tax relevant attributes for the one or more domestic and foreign entities over the one or more years;
receive distribution constraints for each foreign entity, the distribution constraints including a minimum distribution amount and a maximum distribution amount for each foreign entity in each year; and
create one or more distribution scenarios including corresponding tax costs based on the entity data and the distribution constraints and to identify a distribution scenario from the one or more distribution scenarios having a lowest tax and meeting the one or more target distribution amounts.

27. The computer-readable medium of claim 26, wherein the one or more foreign entities includes a first foreign entity and a second foreign entity, and further comprising instructions when executed causing the machine to:
determine a first distribution of the first foreign entity for distribution to the one or more domestic entities;
determine income and withholding tax values subject to the first foreign entity in a first jurisdiction;
determine income and withholding tax values associated with the second foreign entity in a second foreign jurisdiction, including on the first distribution; and
determine an amount available for distribution from the second foreign entity to the one or more domestic entities in a form of a second distribution.

* * * * *